United States Patent [19]
Ishinabe et al.

[11] Patent Number: 5,100,017
[45] Date of Patent: Mar. 31, 1992

[54] PACKING CAN

[75] Inventors: Masao Ishinabe, Atsugi; Yasushi Nishimura, Yokohama; Katsuhiro Imazu, Yokohama; Seishichi Kobayashi, Yokohama; Hiroshi Matsubayashi, Kamakura, all of Japan

[73] Assignee: Toyo Seikan Kaisha Ltd., Tokyo, Japan

[21] Appl. No.: 651,695

[22] Filed: Feb. 6, 1991

[30] Foreign Application Priority Data

Feb. 7, 1990 [JP] Japan .................. 2-26177

[51] Int. Cl.$^5$ .............................. B65D 7/42
[52] U.S. Cl. ..................... 220/669; 220/674
[58] Field of Search ............... 220/669, 674, 670, 675

[56] References Cited

U.S. PATENT DOCUMENTS

| | | | |
|---|---|---|---|
| 941,014 | 11/1909 | Doble | 220/669 |
| 1,240,029 | 9/1917 | Darley | 220/669 |
| 2,036,276 | 4/1936 | Hothersall | 220/674 |
| 2,063,013 | 12/1936 | Cooper | 220/669 |
| 3,448,775 | 6/1969 | Limbach et al. | 220/669 |
| 3,547,299 | 12/1970 | Kepple | 220/674 |
| 3,941,247 | 3/1976 | Cripe | 220/674 |
| 4,050,605 | 9/1977 | Wakana et al. | 220/674 |

Primary Examiner—Joseph Man-Fu Moy
Attorney, Agent, or Firm—Sughrue, Mion, Zinn, Macpeak & Seas

[57] ABSTRACT

Disclosed is a packing can having a circumferential polyhedral wall formed on a can barrel, in which as compared with boundary ridgelines of structural unit faces of the polyhedral wall and crossing points of these boundary ridgelines, the structural unit faces are convex to the interior of the can and the structural unit faces are arranged so that adjacent rows of structural unit faces have a phase difference in the axial direction of the can. This packing can has a very high strength against deformation by application of the external pressure. Furthermore, in preparing this packing can, damage of a coating layer formed on a metal sheet used as the can barrel blank can be effectively prevented.

12 Claims, 12 Drawing Sheets

FIG. 2-A
FIG. 2-B
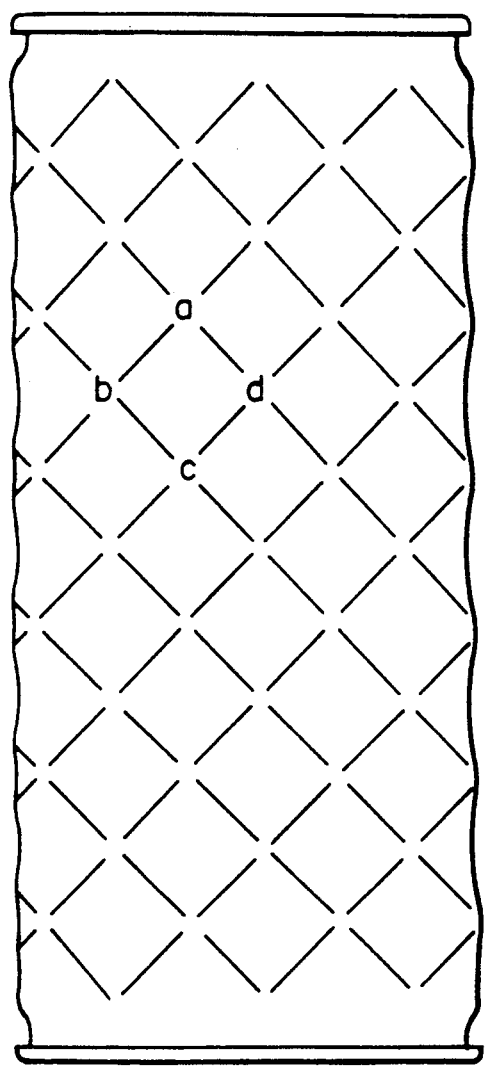
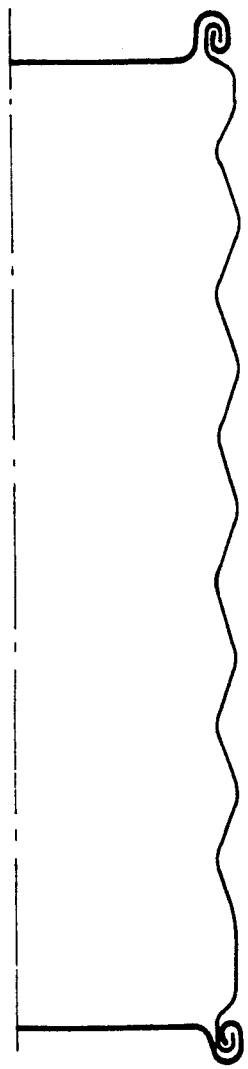

FIG. 2-C
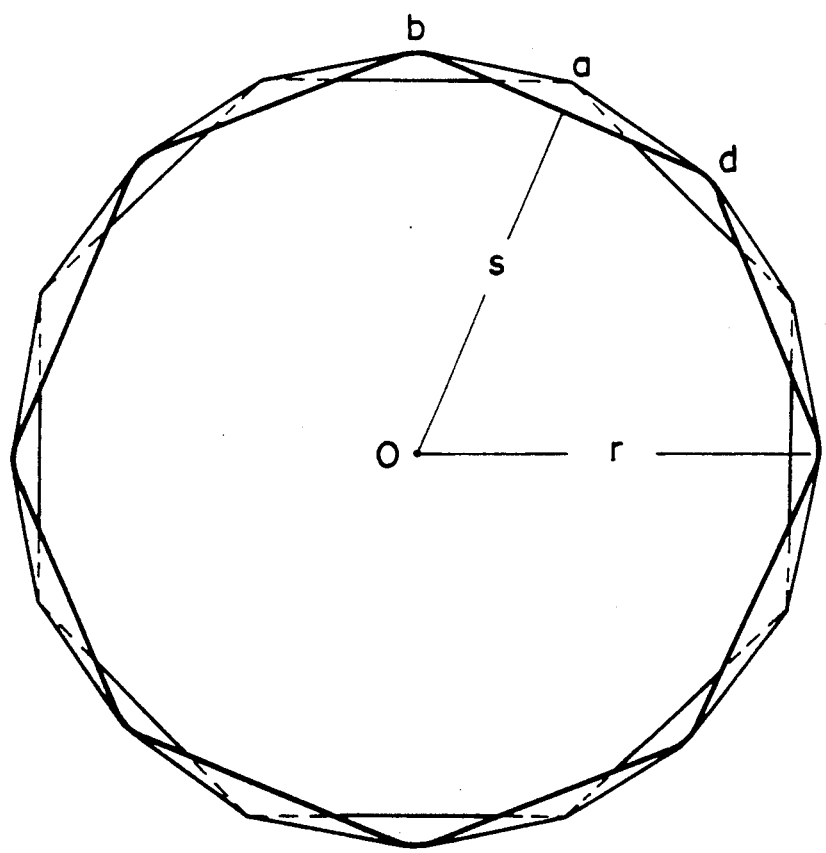

FIG. 7(A)
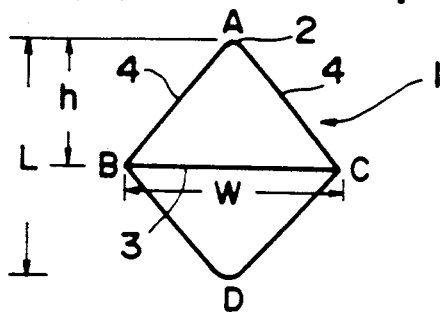
FIG. 7(B)
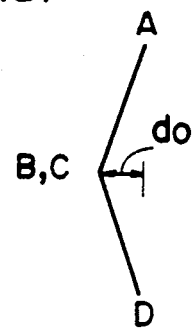
FIG. 8-A
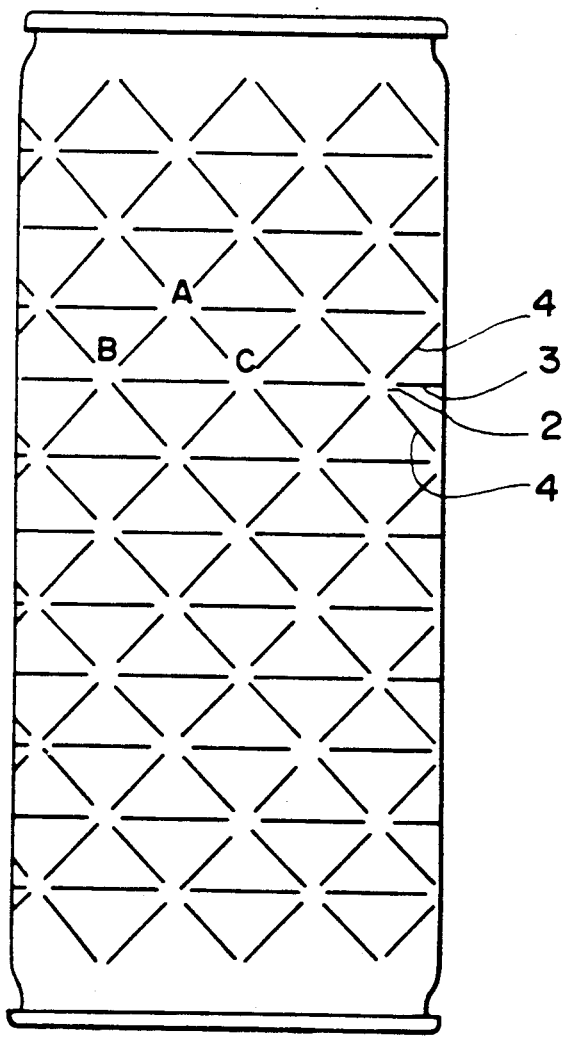
FIG. 8-B
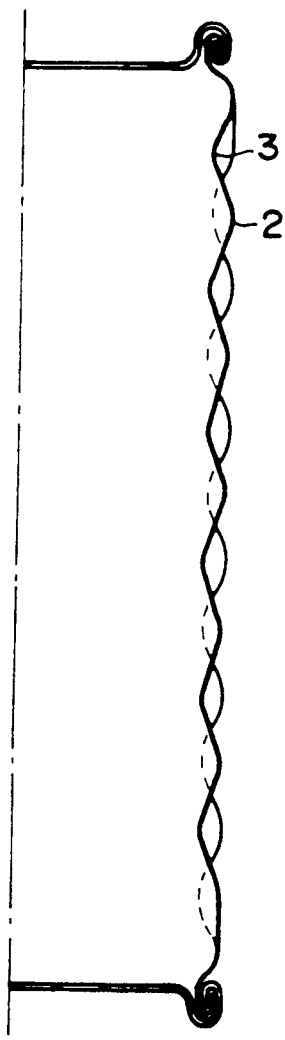

n = 8 n = 4 n = 8 n = 4

PACKING CAN

BACKGROUND OF THE INVENTION

(1) Field of the Invention

The present invention relates to a packing can. More particularly, the present invention relates to a packing can which has an excellent resistance against deformation caused by the reduction of pressure at the cooling step after filling the can with contents or during the subsequent storage, and which makes it is made possible to reduce the thickness of the blank used to form the can.

(2) Description of the Related Art

Metal is mainly used for a packing can and sometimes, a resin material is used. In the case of utilizing a metal sheet, a three-piece can is prepared by forming metal sheet into a cylindrical shape, joining confronting edge portions by welding, bonding or soldering to form a can barrel having a side seam and thereafter wrap-seaming both the ends of the can barrel with top and bottom lids. Alternately, a two-piece can is formed by deep-drawing or further ironing the metal sheet into a bottomed can barrel and wrap-seaming the top end of the bottomed can barrel with a lid.

In these packing cans, efforts have been made to reduce the thickness of the blank as much as possible to lower the material cost of the can and reduce the weight of the can per se. However, reduction of the thickness of the blank should naturally result in reduction of the mechanical strength of the can barrel. Particularly, during the cooling step after filling the can with its contents or during the subsequent storage or transportation thereof, conspicuous deformation (profile deformation) of the can barrel is caused by reduction of the internal pressure. Moreover, in canned products, during handling or transportation, collision of cans cannot be avoided, and deformation of can barrels is also caused by such collision.

If deformation is caused in a can barrel of a packing can, the appearance of the product is degraded and the commercial value is lost, and furthermore, coating defects such as pinholes, cracks and peels are caused in inner and outer protecting coating layers of the metal sheet and such troubles as corrosion, elution of the metal and leakage by pitting are readily caused.

As the conventional means for reinforcing the can barrel member, there is known a method in which beads are formed in the circumferential direction of the can barrel and beads are formed in the direction of the can height (the axial direction of the can).

If beads are formed on a barrel member, the above-mentioned deformation is considerably effectively prevented, but in the case where circumferential beads are formed on the front face of the can barrel member, the increase of the deformation load by the external pressure (the increase of the strength against the deformation by the external pressure) is about 2 times at the maximum, as compared with the case of a similar can having no beads formed. Accordingly, even if the thickness of the blank is considerably reduced, the object of completely preventing deformation by reduction of the pressure is not sufficiently attained.

Furthermore, if beads are formed on a can barrel, undulations appear on the printed outer surface and the appearance or commercial value of the can is lowered and coating defects are also caused on the inner surface of the can, and a defect of increase of the metal exposure (ERV value) attractive. Accordingly, in beaded can barrels now practically used, only circumferential beads are formed at a limited part of the can barrel.

SUMMARY OF THE INVENTION

It is therefore a primary object of the present invention to provide a packing can in which a novel reinforcing structure is introduced instead of the conventional beads, the strength against deformation by application of the external pressure (or reduction of the internal pressure) is highly improved, the appearance characteristics are very good and in case of a coated can, the metal exposure on the inner face of the can is controlled to a relatively low level.

Another object of the present invention is to provide a packing can in which the outer surface of the can has a peculiar three-dimensional and attractive appearance based on a polyhedron, the can barrel can be easily held for drinking or eating of its contents and the resistance to formation of beating marks is good.

In accordance with the present invention, there is provided a cylindrical packing can having a resistance against deformation by the external pressure thereof, which comprises a circumferential polyhedral wall formed at least at a part of a can barrel, said polyhedral wall having structural unit faces, boundary ridgelines where the structural units touch each other, and crossing portions where the boundary ridgelines cross each other, wherein as compared with the boundary ridgelines and crossing portions, the structural unit faces are convex to the interior of the can and the structural unit faces are arranged so that the adjacent rows of structural unit faces have a phase difference in the axial direction of the can.

BRIEF DESCRIPTION OF THE DRAWINGS

FIG. 2-A is a side view of the packing can of the present invention in which a circumferential polyhedral wall having tetragonal structural unit faces is formed on the can barrel, FIG. 2-B is a longitudinally sectional view of this packing can, and FIG. 2-C is a horizontally sectional view of this packing can.

FIG. 7 is a diagram illustrating a structural unit face having an equilateral triangular shape.

FIGS. 8-A and 8-B are side and longitudinally sectional views of a packing can in which a circumferential polyhedral wall having structural unit faces as shown in FIG. 7 is formed on the can barrel.

DETAILED DESCRIPTION OF THE INVENTION

The packing can of the present invention is characterized in that a circumferential polyhedral wall is formed on the can barrel, and as compared with boundary ridgelines of structural unit faces of the polyhedral wall and points of crossing of the boundary ridgelines, the structural unit faces are convex to the interior of the can, and the structural unit faces are arranged so that the adjacent rows of the structural unit faces have a phase difference, especially a phase difference of $\frac{1}{2}$, in the axial direction of the can. By forming a circumferential polyhedral wall comprising such structural unit faces on the can barrel, a very high resistance to deformation by the external pressure can be imparted to the can. This circumferential polyhedral wall need not be formed on the entire surface of the can barrel, but if the circumferential polyhedral wall is formed on a part of the can barrel, for example, on an area of at least 10% of the entire surface of the can barrel, a sufficient deformation can be attained. It is especially preferred that the circumferential polyhedral wall be formed at a central part of the can barrel.

Figure 1:
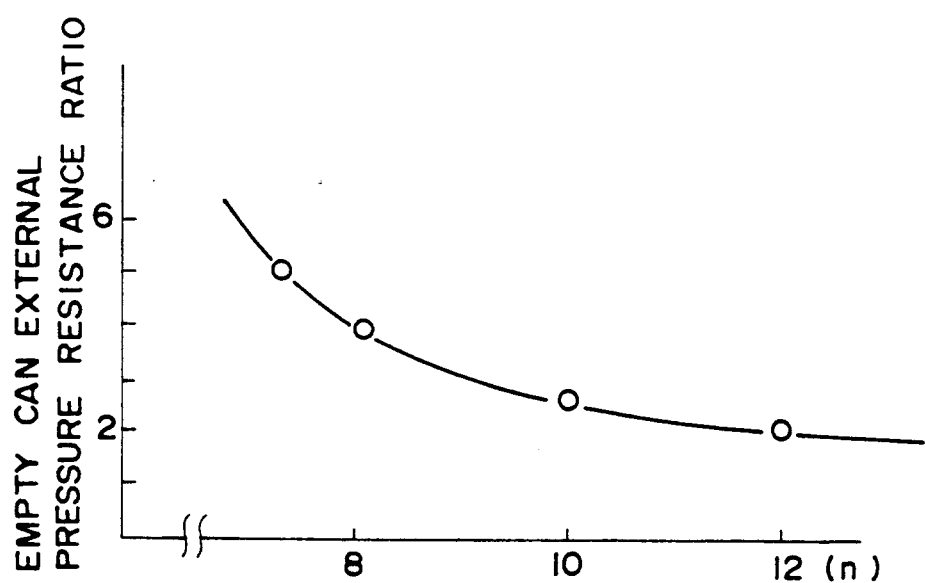
FIG. 1 is a graph showing the relation between the empty can external pressure resistance ratio (the ratio of the external pressure resistance in the case where a circumferential polyhedral wall is formed to the exterior pressure resistance in the case where no circumferential polyhedral wall is formed) and the number n of the structural unit faces of the circumferential polyhedral wall per circle of the can barrel.

The above-mentioned circumferential polyhedral wall can be formed at an optional part of the can barrel, and can be easily formed at a plurality of parts of the can barrel. The number of the structural unit faces of the circumferential polyhedral wall present per circle of the can barrel is a factor which is important for imparting an excellent deformation resistance to the can. It is generally preferred that the number n of the structural unit faces present on the same phase relative to the axial direction of the can per circle of the can barrel be from 3 to 14, though the preferred number n differs to some extent according to the shape of the structural unit faces. Especially in case of tetragonal structural unit faces, it is preferred that the number n be from 4 to 12, and in case of hexagonal structural unit faces, it is preferred that the number n be from 3 to 10. The empty can external pressure resistance ratio between a can having a circumferential polyhedral wall of structural unit faces of an equilateral triangular shape formed on the can barrel and a can having no circumferential polyhedral wall formed on the can barrel is plotted to the number n of the structural unit faces in FIG. 1. From FIG. 1, is seen that with increase of the number n, the empty can external pressure resistance ratio is reduced, and if the number n exceeds 14, no improvement of the empty can external pressure resistance ratio is attained. If the number n is smaller than 3, a sufficient circumferential polyhedral wall cannot be formed on the can barrel, and furthermore, since bending is sharp on the can barrel surface, the corrosion resistance of the coating is drastically degraded and the appearance becomes bad.

The can barrel having the circumferential polyhedral wall comprising the above-mentioned structural unit faces is concave inwardly of the can at each structural unit face. As is apparent, for example, from FIGS. 2-B and 8-B showing the section of the can barrel, each structural unit face is curved toward the inner side of the can or appears as a V-shaped dent. In the conventional can, the sectional side face of the can barrel appears as a straight line in the axial direction of the can.

In the present invention, by forming the structural unit faces in the above-mentioned manner and arranging these structural unit faces so that the adjacent rows of the structural unit faces have a phase difference, especially a phase difference of $\frac{1}{2}$, in the axial direction of the can, a deformation resistance is inputted to the can barrel. Moreover, if this arrangement of the structural unit faces is adopted, it is possible to form the circumferential polyhedral wall so that the surface area of the can barrel before the formation of the circumferential polyhedral wall is substantially equal to the surface area of the can barrel after the formation of the circumferential polyhedral wall. Therefore, the coating film is not damaged and an excellent corrosion resistance is maintained, and the stress left after the working is small and reduction of the adhesion of the coating and the bonding force of the seam during the retort sterilization or with the lapse of time after the retort sterilization can be effectively prevented.

In the present invention, the shape of the structural unit faces constituting the circumferential polyhedral wall is not particularly critical, so long as the circumferential polyhedral wall having a structure mentioned above is formed on the can barrel. For example, the structural unit faces may have tetragonal or hexagonal shape, or a polygonal shape having rounded corners, that is, a shape close to a circular shape. A tetragonal shape is especially preferable for imparting an excellent deformation resistance to the can barrel.

Specific shapes of structural unit faces will now be described.

Figure 3A:
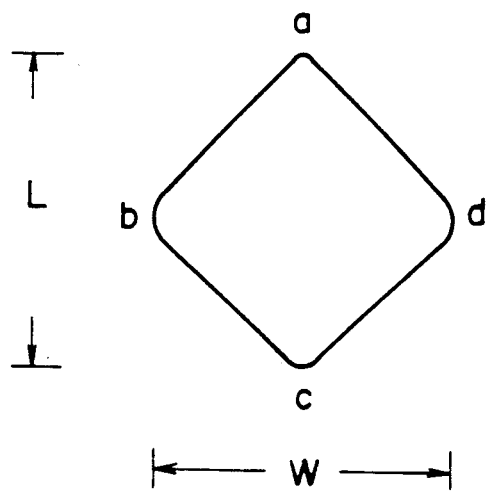
FIGS. 3(a) and 3(b) are plane and sectional views showing an example of the structural unit face of the circumferential polyhedral wall formed on the can barrel of the packing can of the present invention.
Figure 3B:
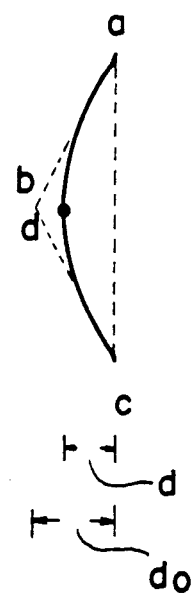

An embodiment in which the structural unit faces have a tetragonal shape is illustrated in FIGS. 3(a) and 3(b). Namely, FIG. 3(a) is a plan view of the structural unit face and FIG. 3(b) is a sectional side view thereof. The structural unit face has a rhombic shape abcd, and each of sides ab, bc, cd and da is a boundary ridgeline formed on the side face of the can. The crossing points of these boundary ridgelines are apexes, a, b, c and d convex to the outside. The line portion connecting b and d is gently curved, and the structural unit face is convex to the interior of the can.

Referring to FIG. 2-C showing the horizontal section of the can shown in FIG. 2-A, the respective apexes a through d of the rhombic structural unit face project substantially in the radial direction and they are located on the circle having radius r from the center ◯ of the can barrel. The central point (middle point between b and d) of the rhombic structural unit face is located on the most inner side in the radial direction. By forming a circumferential polyhedral wall having these structural unit faces in which the central portion is curved to form a trough on the can barrel, the surface area of the can barrel before the formation of the polyhedral wall is kept substantially equal to the surface area of the can barrel after the formation of the polyhedral wall, and damage of the coating film and cracking of the surface treatment layer can be effectively prevented, as described above. Furthermore, the trough formed in the central portion of the structural unit face is a smooth curved portion, and a design can be formed on the trough with a good reproducibility to impart an attractive appearance and as in the case of the conventional cylindrical can, the content is not substantially left in the vessel.

Figure 4:
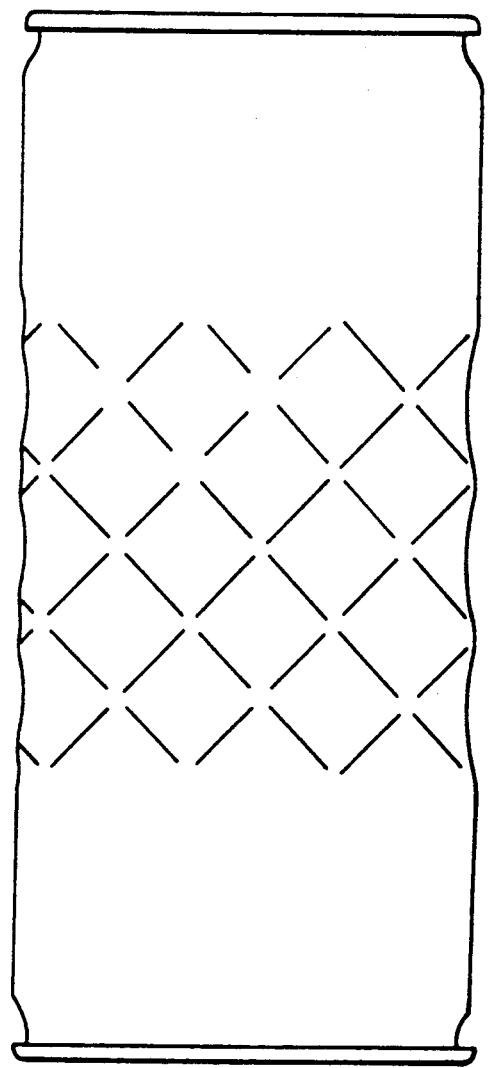
FIG. 4 is a side view of a packing can where the circumferential polyhedral wall shown in FIG. 2 is formed only at the central part of the can barrel.

As seen from FIGS. 2-A and FIG. 4, which are side views showing a can in which circumferential polyhedral wall comprising such rhombic structural unit faces is formed on the can barrel, these structural faces are arranged in rows in either the circumferential direction or the axial direction so that adjacent rows of the structural unit faces having a phase difference of ½ in the axial direction.

In the present invention, in the case where such tetragonal structural unit faces are arranged on the can barrel, it is preferred that the boundary ridgelines of the structural unit faces should not extend along the axial direction of the can (the vertical direction in the drawings). If this arrangement of the structural unit faces is adopted, the strength against deformation of the can barrel by the external pressure is unexpectedly improved. It is considered that this effect is probably attained because the rhombic structural unit faces are built in the wall of the can barrel firmly and integrally with one another, though the mechanism has not been elucidated.

Figure 5:
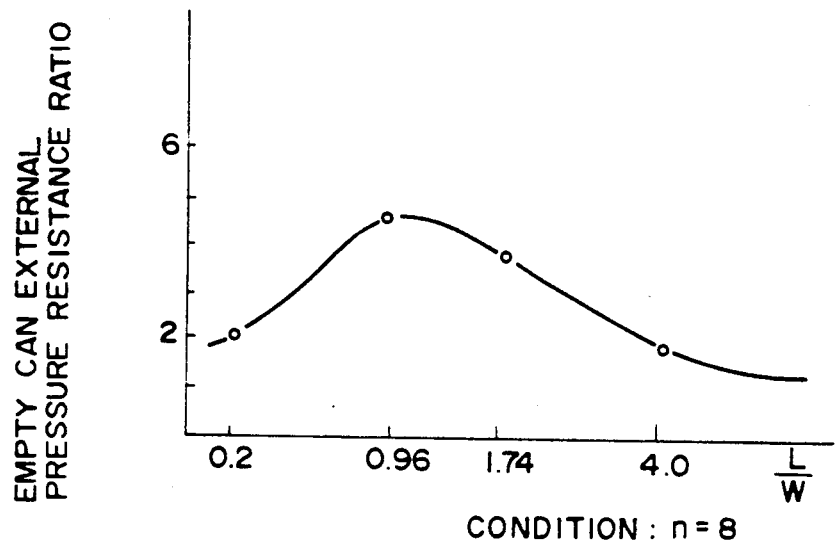
FIG. 5 is a graph illustrating the relation between the L/W value (in which L represents the maximum length of the structural unit face in the axial direction of the can and W represents the maximum width of the structural unit face in the circumferential direction) of the circumferential polyhedral wall formed on the can barrel and the empty can external pressure resistance.

Referring to FIGS. 3(a) and 3(b) again, in this rhombic shape, W representing the length bc is the maximum width of the structural unit face and L representing the height ac is the maximum length in the axial direction. In the present invention, it is preferred that the relation of $0.2 \leq L/W \leq 4$ be established between W and L. As is apparent from FIG. 5, illustrating the relation between this L/W value and the empty can external pressure resistance ratio, if the L/W value exceeds the above range, the intended effect of improving the empty can external pressure resistance ratio tends to lower, though there arises no substantial problem about the appearance. In contrast, if the value L/W is too small and below the above range, although the empty can external pressure resistance ratio is good, the can barrel per se is readily deformed by the axial compression, and the appearance is degraded and, for example, the quality of a printed image formed on the surface of the can is degraded. This relation between the value L/W and the empty can external pressure resistance ratio is similarly established in the structural unit face having a hexagonal shape or other shape, as well as in the structural unit face having a tetragonal shape such as a rhombic shape.

Figure 6:
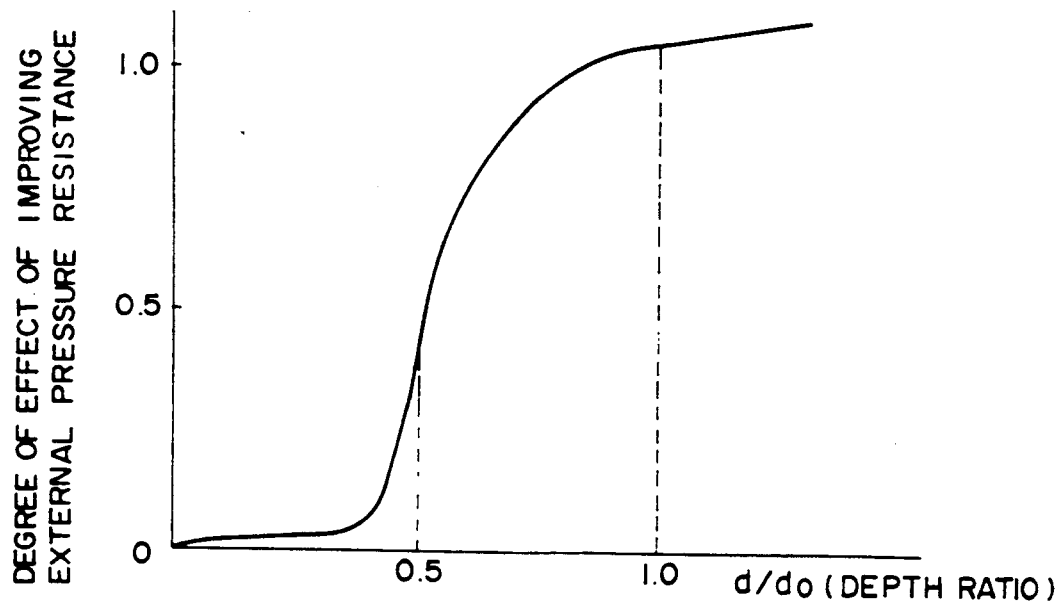
FIG. 6 is a graph illustrating the relation between the depth ratio of the structural unit face and the empty can strength against the outer pressure.

Referring to FIGS. 2-C, 3(a) and 3(b), the depth quantity d of the central portion of the structural unit face (the quantity of the concavity from the straight circumferential face of the can barrel at a part where the structural unit face is not formed) also is a factor important for obtaining a sufficient external pressure resistance. Supposing that the radius of the can barrel is r, the crossing points a through d of the structural unit face are located on this radius, though there are produced errors by reason of molding. Supposing that the distance from the middle point of the line connecting the crossing points b and d to each other in the circumferential direction (the maximum width W of the structural unit face in case of the tetragonal shape) to the center O of the can barrel is s, it is preferred that the relation of the difference do of (r-s) between the radius r and this distances, which is the index representing the depth of the structural unit face, to the depth quantity d of the structural unit face should satisfy the requirement of $0.5 \leq d/do \leq 2$ (this ratio will be referred to as "depth ratio" hereinafter). Namely, in a packing vessel as shown in FIG. 2-C, as is seen from FIG. 6 illustrating the relation between this depth ratio d/do and the empty can external pressure resistance, if this depth ratio d/do is below the above-mentioned range, it often happens that no satisfactory external pressure resistance is attained. If the depth ratio d/do exceeds the above range, buckling is readily caused in the axial direction of the can, and the difference between the surface area of the can barrel before the formation of the circumferential polyhedral wall and the surface area of the can barrel after the formation of the circumferential polyhedral wall becomes large, with the result that the adhesion of the coating to the can and the bonding force of the seam tend to lower and the appearance of the printed surface is degraded.

Furthermore, the value do has a close relation to the maximum width W of the structural unit face, and W has a relation to the maximum length L in the axial direction. Consequently, the depth quantity d has a close relation to both of W and L and the allowance range of the depth quantity d is changed according to W and L. For example, in case of a tetragonal structural unit face, since the relations of do=r-s, s=rcos($\pi$/n) and w=2rsin($\pi$/n) are established, do is represented by the formula of $\frac{1}{2} \cdot w[\sin(\pi/n)]^{-1} \cdot [1-\cos(\pi/n)]$, and it is understood that do is determined by the maximum width W and the number n of the structural unit faces present in the circumferential direction. Accordingly, in view of the above-mentioned preferred range of the depth ratio d/do, it is understood that the preferred value of the depth quantity d increases as W increases and the preferred value of d/do decreases as in increases.

In the present invention, a complete fold can be formed in the central portion of the rhombic structural unit face shown in FIGS. 3(a) and 3(b) to form minimum structural unit faces having a shape of an equilateral triangle. This structural unit face is shown in FIGS. 7(A) and 7(B), and a can having the circumferential polyhedral wall comprising these structural unit faces is shown in FIGS. 8-A and 8-B. In this case, the section of the structural unit face has a V-shape, and as shown in FIG. 8-A, the equilateral triangle ABC forms a minimum structural face unit (basic structural face unit), and each of sides AB, BC and CA of the equilateral triangle is commonly held by two equilateral triangles. Incidentally, the shape and dimension of this equilateral triangle is represented by the length W of the base BC and the height h of the triangle as follows.

In this arrangement of the structural unit faces, the apex 2 is projecting outwardly in the radial direction of the can barrel and the base is most indented inwardly in the radial direction, and opposite sides 4 are located at intermediate positions between the apex and base. In the polyhedron thus constructed, the opposite sides 4 are ridgelines and the base 3 is a trough.

In this embodiment, it is preferred that the value of 2h/W (h=½·L), which corresponds to the value L/W in the above-mentioned rhombic structural unit face, be in the range of from 0.2 to 4, and that also the number n of the structural unit faces present in the circumferential direction be in the above-mentioned range.

In this structural unit faces, the depth quantity d is substantially equal to do if some errors produced by reason of molding are neglected, and the surface area of the can barrel before the formation of the polyhedral wall can be made substantially equal to the surface area of the can barrel after the formation of the polyhedral wall.

Figure 9:
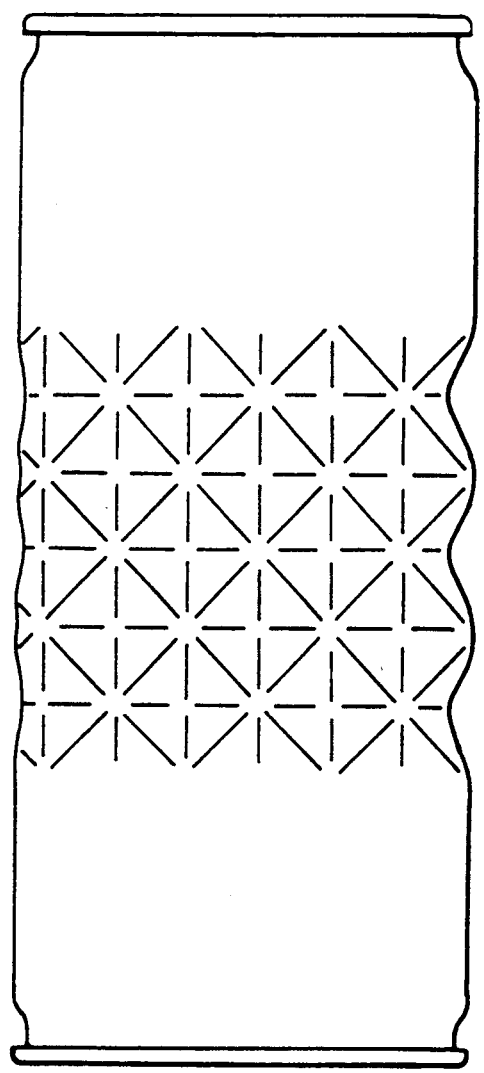
FIG. 9 is a side view of a packing can in which circumferential polyhedral wall having structural unit faces having a shape different from the shape shown in FIG. 7 is formed on the can barrel.

In order to reinforce the structural unit face shown in FIG. 8, the structural unit face, which is an indent, can be partially bent along the axial direction (see FIG. 9). In this structural unit face, the depth quantity d can be increased to 2do, if some errors produced by reason of molding are neglected, and the empty can external pressure resistance is highly improved, a sufficiently high mechanical strength is attained and the stress left in the can body after the working is reduced. Accordingly, reduction of the adhesion of the coating and the bonding force of the seam during and after the retort sterilization can be effectively prevented. A good geometric appearance and a high corrosion resistance can be maintained, and an advantage is attained in that the can is easy to carry and handle.

Figure 10:
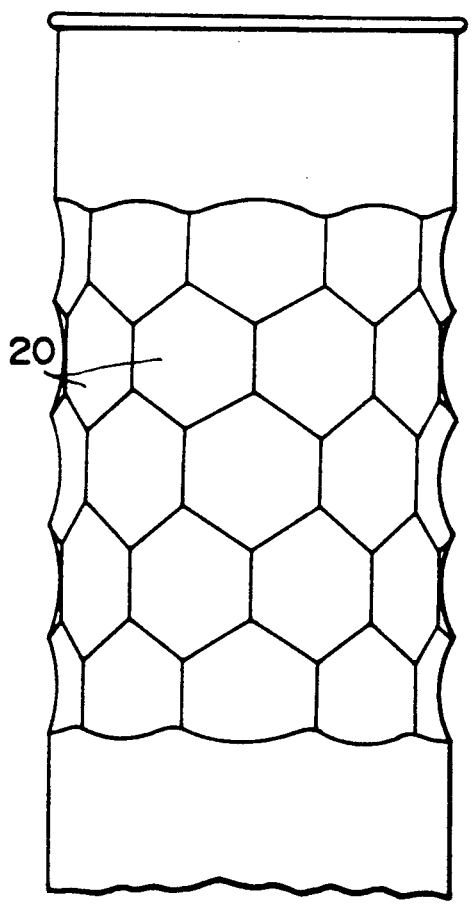
FIG. 10 is a side view illustrating a packing can in which a circumferential polyhedral wall having structural unit faces having a hexagonal shape is formed on the can barrel.
Figure 11:
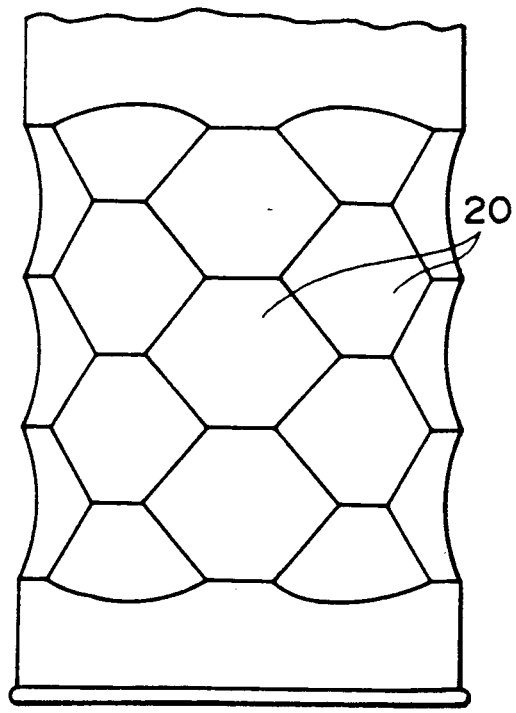
FIG. 11 is an enlarged view illustrating a part of the packing can shown in FIG. 10.

An embodiment of the present invention in which structural unit faces have a hexagonal face is shown in FIGS. 10 and 11. FIG. 10 shows an example where the number n is 8, and FIG. 11 shows an example where the number n is 4. In each example, the structural unit faces are arranged so that the adjacent rows of the structural unit faces have a phase difference of about ½ in the axial direction. It is preferred that the number n be in the range from 3 to 14 and that the value L/W be in the range of from 0.2 to 4. In this embodiment, the maximum width W of the structural unit face is not always the length between the crossing points of the structural unit face but sometimes, the maximum width W is the length between points on the boundary ridgelines, as shown in FIG. 11, and the maximum length L in the axial direction is not always the length between the crossing points of the structural unit face but sometimes, the maximum length L is the length between points on the boundary ridgelines, as shown in FIG. 10. It is preferred that also in such structural unit faces, the same relation as mentioned above with respect to structural unit faces having a tetragonal shape be established between the depth quantity d and the value do.

In the present invention, the apex 32 where boundary ridgelines 30 of the structural unit face is not formed as a sharp angular portion but can be formed to have a certain curvature radius R. In this case, R can be related to the sheet thickness t and the radius r of the can barrel. Preferably, the relation of $t \leq R \leq (\frac{1}{4})r$ is established. If a curve is thus formed along the boundary ridgeline so that the above requirement is satisfied, the adhesion of the coating applied to the formed can is maintained at a high level and the coating film is not damaged. One of the above-mentioned curves may be present in the vicinity of the boundary ridgeline, that is, the maximum bending R may be present at one point in the vicinity of the ridgeline. Alternatively, a plurality of curves having a plurality of certain bending R's may be present in the dispersed state. In this case, preferably R formed in the vicinity of the ridgeline is within the above-mentioned range.

Figure 14:
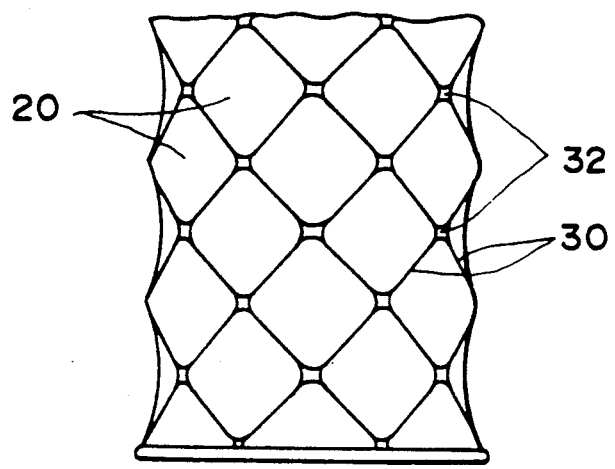
FIG. 14 is a side view illustrating a part of a packing can in which a circumferential polyhedral wall having structural unit faces having a tetragonal shape having a curvature is formed on the can barrel.

Also in the embodiment where the structural unit face has a tetragonal shape as shown in FIG. 14, R can be formed.

The present invention can be applied not only to a so-called three-piece can obtained by forming a metal sheet or the like into a cylinder, joining confronting edges by welding, bonding or soldering to form a can barrel having a side seam and wrap-seaming the can barrel with top and bottom lids, but also to a so-called two-pieces can obtained by subjecting a metal sheet to deep-draw forming or further ironing and wrap-seaming a lid on the top end of the formed bottomed can barrel.

The packing can of the present invention can be prepared by forming a polyhedral wall as mentioned above by pressing the can barrel by using inner and outer molds before wrap seaming with the lid. The inner mold used has on the surface thereof projections corresponding to the apexes and ridgelines of the polyhedron, and the outer mold used has on the surface thereof projections corresponding to troughs of the polyhedron. The polyhedron is formed by meshing the inner and outer molds with each other through the can barrel.

Figure 15:
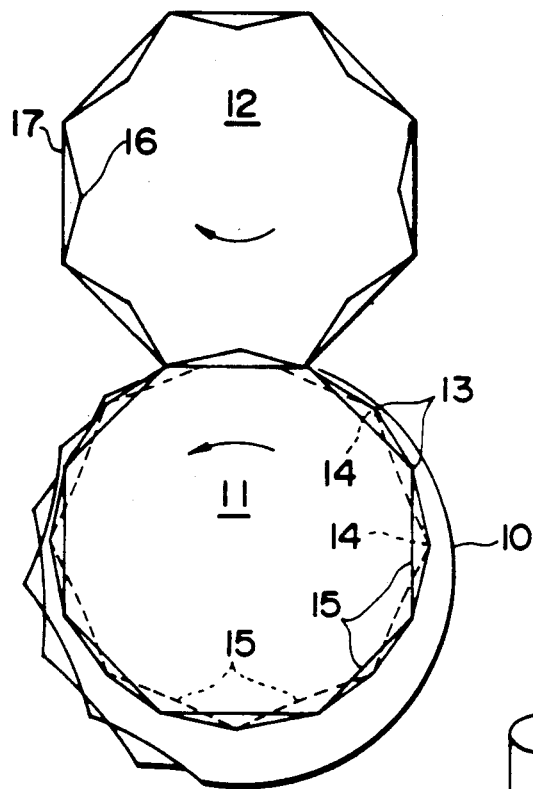
FIGS. 15 and 16 are diagrams illustrating processes for forming a polyhedron on the can barrel.
Figure 16:
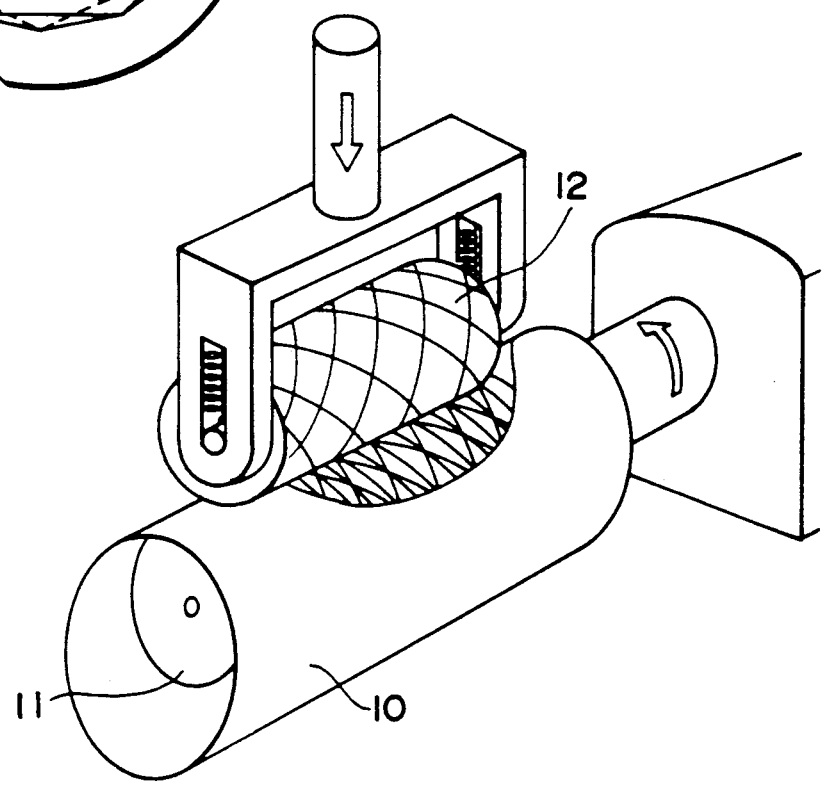

FIGS. 15 through 19 are diagrams illustrating the process for forming a polyhedron having tetragonal structural unit faces or minimum structural unit faces having a shape of an equilateral triangle. The can barrel 10 is turned in the state gripped between inner and outer molds 11 and 12. On the surface of the inner mold 11 there are formed projections 13 corresponding to apexes of the polyhedron and rhombic faces 14 (only halves of the faces are shown in FIG. 15) inclined to the circumferential face of the can, and in FIG. 15, curved parts (troughs or bases in case of the equilateral triangle) 15 are shown as the lines of the central cut faces. On the surface of the outer mold 12, there are formed concavities 16 corresponding to the projections 13.

Figure 17:
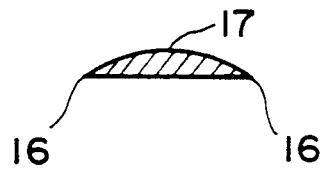
FIGS. 17 and 18 are enlarged sectional views showing partially outer molds used for forming a polyhedron.
Figure 18:
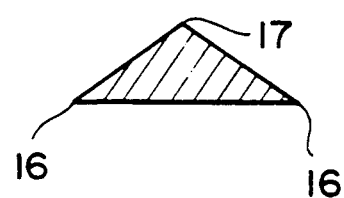

As is seen from FIGS. 17 and 18 which are enlarged sectional views showing a part of the outer mold 12, a curved or corner portion 17 is formed around the concavity 16. For example, if the outer mold 12 shown in FIG. 17 is used, a structural unit face having a dent having a curve along 16-17-16 can be formed. If the outer mold 12 shown in FIG. 18 is used, a structural unit face having an equilateral triangle as the minimum unit can be formed. If an elastic material such as a rubbery material is used for the outer mold 12 shown in FIG. 18, a rhombic structural unit face can be formed.

By meshing these inner and outer molds 11 and 12 is through the can barrel 10 and turning these molds at synchronous speeds, a polyhedron can be formed on the can barrel. Incidentally, in the case where the mesh between the molds partially slips off, the rotation shaft for the inner mold or outer mold can be vertically moved to some extent.

Figure 19:
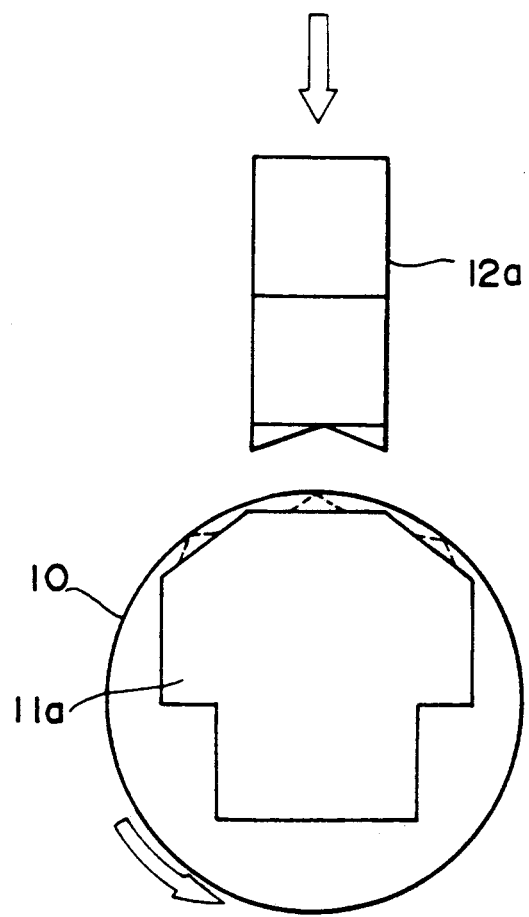
FIG. 19 is a diagram illustrating another process for forming a polyhedron on the can barrel.

In the foregoing embodiment, although the inner and outer molds 11 and 12 have a diameter smaller than that of the can barrel 10, and number of the basic structural unit faces arranged in the circumferential direction on the surfaces of the inner and outer molds 11 and 12 is smaller by one or a few than the number of the structural unit faces on the circumference of the can barrel, no practical problem arises when the polyhedron is formed. When the inner and outer molds 11 and 12 are separated from each other, the can barrel having the polyhedron formed thereon can be easily taken out. According to another process, an inner mold 11a having a partial circumferential face having a circumferential length shorter than ¼ of the circumference of the can barrel and an outer mold 12a having a similar circumferential face are used, as shown in FIG. 19, and in the state where the can barrel is positioned, and a plurality of the polyhedron-forming operation is conducted a plurality of times by the inner and outer molds 11a and 12a over the entire circumference of the can barrel. Also in this case, one or both of the molds may be formed of a elastic material.

The polyhedron-forming operation can be conducted on the entire surface of the can barrel or the top end portion, bottom end portion or central portion of the can barrel, or at a plurality of parts. When necking working is performed on the top end or bottom end of the can barrel, it is preferred that the polyhedron-forming operation be conducted on a portion other than the necked portion.

Figure 12:
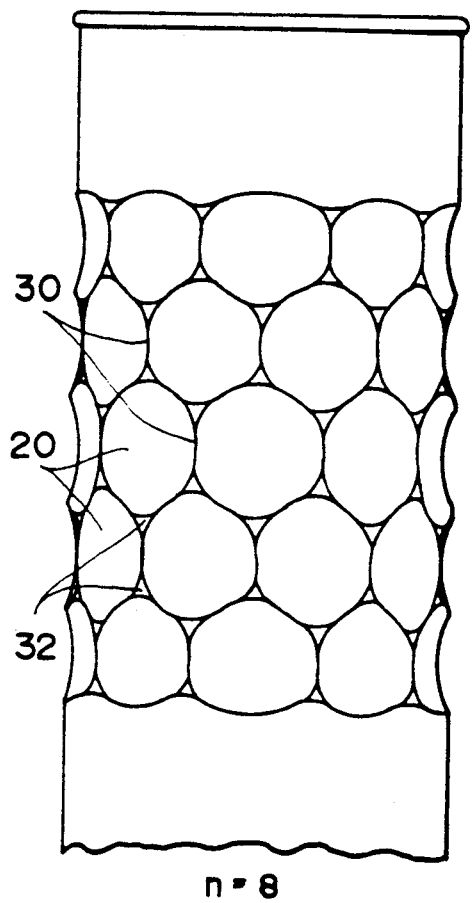
FIG. 12 is a side view illustrating a packing can in which a circumferential polyhedral wall having structural unit faces having a hexagonal shape having a curvature is formed on the can barrel.
Figure 13:
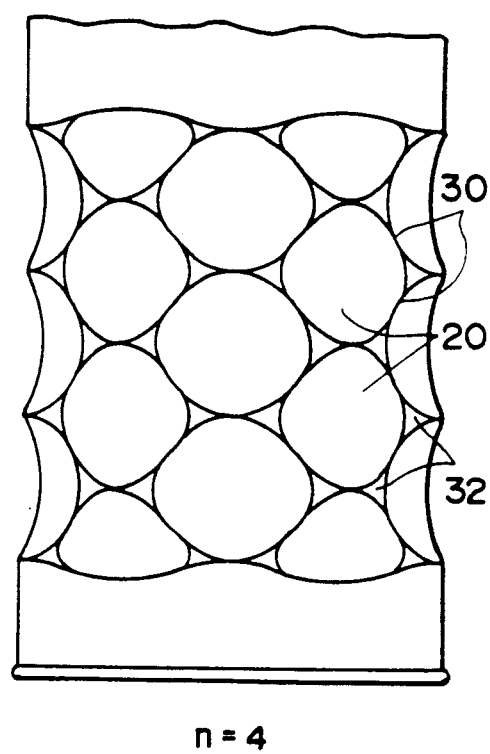
FIG. 13 is an enlarged view illustrating a part of the packing can shown in FIG. 12.

In the case where the structural unit face having a hexagonal shape as shown in FIGS. 10 through 13, a mold corresponding to the shape of the structural unit face can be used, and portions of troughs and apexes can be formed to have predetermined R, whereby a boundary portion having a gentle curve as shown in FIGS. 12 and 13 or FIG. 14 can be formed.

In the present invention, preferably, the structural unit face is formed on the can barrel by the bulging method. According to the bulging method, a member of an expandable and compressible material, for example, a synthetic rubber member of a slot structure, is inserted into the can barrel and is expanded in the can barrel to increase the diameter of the can barrel. As a modification of this bulging method, there can be adopted a process in which an outer mold for the structural unit faces is arranged around the circumference of the can barrel, the can barrel is expanded by the expandable and compressible member and the can barrel is pressed tightly to the outer mold, whereby the above-mentioned structural unit faces can be formed on the can barrel while increasing diameter of the can barrel and reducing the thickness of the can barrel. In the case where this process is adopted for forming the structural unit faces, both the end portions of the can barrel can be subjected to necking in advance, and the intended thickness reduction can be easily accomplished. Moreover, the structural unit faces can be precisely arranged on the can barrel.

In the present invention, various surface-treated steel sheets and sheets of light metals such as aluminum can be used as the metal sheet for the can barrel.

As the surface-treated steel sheet, there can be used steel sheets obtained by annealing a cold-rolled steel sheet, subjecting the annealed sheet to secondary cold rolling and subjecting the cold-rolled steel sheet to at least one surface treatment selected from zinc deposition, tin deposition, nickel deposition, electrolytic chromate treatment and chromate treatment. As a preferred example of the surface-treated steel plate, there can be mentioned an electrolytically chromate-treated steel sheet, and an electrolytically chromate-treated steel sheet comprising 10 to 200 mg/m$^2$ of a metallic chromium layer and 1 to 50 mg/m$^2$ (calculated as metallic chromium) of a chromium oxide layer is especially preferably used because this steel sheet is excellent in the combination of the coating adhesion and corrosion resistance. Another example of the surface-treated steel sheet is a hard tinplate having a deposited tin amount of 0.5 to 11.2 g/m$^2$, and preferably, this tinplate is subjected to a chromate treatment or a chromate/phosphate treatment so that the deposited chromium amount is 0.5 to 100 mg/m$^2$ as metallic chromium.

Not only a so-called pure aluminum sheet but also an aluminum alloy sheet can be used as the light metal sheet. An aluminum alloy sheet having excellent corrosion resistance and workability comprises 0.2 to 1.5% by weight of Mn, 0.8 to 5% by weight of Mg, 0.25 to 0.3% by weight Zn and 0.15 to 0.25% by weight of Cu, the balance being aluminum. When these light metal sheets are precoated, it is preferred that they be subjected to a chromate treatment or a chromate/phosphate treatment so that the chromium amount is 3 to 300 mg/m$^2$ as metallic chromium.

The metal thickness in the can barrel differs according to the kind of the metal, but if a thin surface-treated steel sheet having a thickness of 0.02 to 0.24 mm, especially a thickness of 0.12 to 0.17 mm or an aluminum sheet having a thickness of 0.1 to 0.4 mm, especially a thin aluminum sheet having a thickness of 0.14 to 0.3 mm, is used in the present invention, a can having a high external pressure resistance can be obtained.

In the present invention, if a protecting coating of a resin is formed on the metal sheet at any stage prior to the formation of the polyhedral wall and the coated metal sheet is subjected to the polyhedral-forming operation, the protecting coating is not damaged. This is one prominent advantage attained by the present invention. The protecting coating can be formed by applying a protecting paint or laminating a film of a thermoplastic resin.

An optional protecting paint comprising a thermosetting resin or thermoplastic resin can be used as the protecting paint. For example, there can be mentioned modified epoxy paints such as a phenol-epoxy resin and an amino-epoxy paint, vinyl and modified vinyl paints such as a vinyl chloride/vinyl acetate copolymer, a partially saponified vinyl chloride/vinyl acetate copolymer, a vinyl chloride/vinyl acetate/maleic anhydride copolymer, an epoxy-modified vinyl paint, an epoxy/amino-modified vinyl paint and an epoxy/phenol-modified vinyl paint, acrylic resin paints, and synthetic rubber paints such as styrene/butadiene copolymer. These paints can be used singly or in the form of a mixture of two or more of them.

These paints are applied to a metal blank in the form of an organic solvent solution such as an enamel or a lacquer or an aqueous dispersion or aqueous solution by roller coating, spray coating, dip coating, electrostatic coating or electrophoretic deposition. Of course, if the resin paint is a thermosetting paint, the paint can be baked according to need. In view of the corrosion resistance and workability, it is preferred that the thickness of the protecting coating be 2 or 30 μm, especially 3 to 20 μm (dry state). Moreover, in order to improve the workability, a lubricant can be incorporated into the coating.

As the thermoplastic resin film to be laminated, there can be mentioned films of olefin resins such as polyethylene, polypropylene, an ethylene/propylene copolymer, an ethylene/vinyl acetate copolymer, an ethylene/acrylic ester copolymer and an ionomer, films of polyesters such as polyethylene terephthalate, polybutylene terephthalate and an ethylene terephthalate/isophthalate copolymer, films of polyamides such as nylon 6, nylon 6,6, nylon 11 and nylon 12, a polyvinyl chloride film, and a polyvinylidene chloride film. These films may be undrawn films or biaxially drawn films. It is generally preferred that the thickness of the thermoplastic film be 3 to 50 $\mu$m, especially 5 to 40 $\mu$m. Lamination of the film on the metal sheet can be accomplished by fusion bonding, dry lamination or extrusion coating, and if the adhesiveness (heat fusion bondability) between the film and metal sheet is poor, for example, a urethane adhesive, an epoxy adhesive, an acid-modified olefin adhesive, a copolyamide adhesive or a copolyester adhesive can be interposed between them.

In case of a three-piece can, the above-mentioned resin-coated metal sheet is formed into a cylinder, uncoated edges of the cylinder are welded according to the known electric resistance welding method and the weld seam is covered with a resin to form a can barrel. Alternatively, a can barrel can be formed by heatbonding the edges through a nylon type adhesive, or in the case where a metallic tin layer is present on the edges, bonding can be accomplished by soldering.

In case of a two-piece can, the coated metal sheet is subjected to draw-forming or deep-draw-forming to form a bottomed can barrel in which the total draw ratio is from 1.1 to 4.0, especially from 1.5 to 3.0, and a polyhedron as described above is formed on the bottomed can barrel. Of course, at the deep-drawing step or subsequently thereto, thickness-reducing elongation or ironing can be performed. In the case where ironing is carried out, a resin coating may be formed in advance, or a resin coating may be formed on the can barrel after ironing.

In the packing can of the present invention, by controlling the L/W ratio, the number n of the structural unit faces and the depth quantity d of the structural unit faces within the above-mentioned preferred ranges, an optimum external resistance and a high metal exposure-preventing effect can be attained in combination. Moreover, in the packing can of the present invention, by dint of the specific polyhedral structure and shape, a special three-dimensional and beautiful appearance can be manifested. Still further, since projections as mentioned above are formed, it is possible to hold and handle the can without any risk of slippage. Moreover, beat marks are hardly formed by collision of cans against each other or against a foreign substance.

EXAMPLES

Example 1

On a can barrel of a bonded can having an outer diameter of about 50 mm and a can height of 120 mm, which was formed by lap-bonding a TFS material having a thickness of 0.15 mm and an epoxy paint coating having a thickness of 5 $\mu$m through a polyamide type adhesive, there was formed a circumferential polyhedral wall comprising nine minimum structural units, as shown in FIG. 3, arranged at a width of 90 mm with a phase difference of $\frac{1}{2}$ in the axial direction of the can by using a pressing tool so that the L/W ratio was 0.20 and the depth quantity d/do was 0.95. Top and bottom lids were wrap-seamed on both the ends of the can barrel, and an external pressure was applied to the formed empty can and the external pressure resistance of the can barrel was measured. It was found that the external pressure resistance was about 2.0 kg/cm$^2$.

In order to examine the damage of the inner face coating by the working, the ERV value was measured. It was found that the ERV value was as small as 0.1 mA.

The packing test was carried out in the following manner.

A coffee drink was hot-filled in the can at 95° C., and the filled can was heat-sterilized at 120° C. for 30 minutes and cooled under pressure, and the state of deformation of the can was observed and the can was stored at 37° C. for 6 months. The vacuum degree in the can at 25° C. was 40 cmHg. After the storage, the can was opened, and the state of corrosion of the inner surface of the can was examined and the amount of iron eluted into the content was measured.

The obtained results are shown in Table 1.

Examples 2 through 7

A can barrel having a circumferential polyhedral wall was formed in the same manner as described in Example 1 except that the L/W ratio of the minimum structure faces shown in FIG. 3 was changed as shown in Table 1. The external pressure resistance and ERV value of the can barrel were measured in the same manner as described in Example 1 and the packing test was carried out in the same manner as described in Example 1.

The obtained results are shown in Table 1.

Comparative Examples 1 through 3

A can barrel having a circumferential polyhedral wall was prepared in the same manner as described in Example 1 except that the L/W ratio of the minimum structural unit faces was changed as shown in Table 1. The external pressure resistance and the ERV value of the can barrel were measured and the packing test was carried out in the same manner as described in Example 1.

Comparative Example 4

With respect to the same can barrel as used in Example 1 except that the circumferential polyhedral wall was not formed, in the same manner as described in Example 1, the external pressure resistance and the ERC value were measured, and the packing test was carried out.

The obtained results are shown in Table 1.

Examples 8 through 13

A can barrel having a circumferential polyhedral wall was prepared in the same manner as described in Example 1 except that the thickness of TFS was 0.12 mm and nine minimum structural unit faces shown in FIG. 3 were arranged continuously in the circumferential direction so that the L/W ratio was 0.96 and the depth quantity d/do was as shown in Table 1. In the same manner as described in Example 1, the external pressure resistance and ERV value were measured and the packing test was carried out. The obtained results are shown in Table 1.

An apple juice was hot-filled in this can at 95° C. after cooling, the state of deformation of the can was observed and the can was stored at 37° C. for 6 months. The vacuum degree in the can was 40 cmHg at 25° C. After the storage, the can was opened, and the state of corrosion of the inner surface of the can was observed and the amount of iron eluted in the content was measured. The obtained results are shown in Table 1.

Comparative Examples 5 through 7

A can barrel having a circumferential polyhedral wall was prepared in the same manner as described in Example 1 by arranging 9 minimum structural unit faces shown in FIG. 3 continuously in the circumferential direction except that the L/W ratio was 0.96 and the depth quantity d/do was as shown in Table 1. In the same manner as described in Example 1, the external pressure resistance and ERV value were measured and the packing test was carried out.

The obtained results are shown in Table 1.

Examples 14 through 18

By using a welded can barrel of a tinplate sheet having a thickness of 0.17 mm, a can barrel having a circumferential polyhedral wall was prepared in the same manner as described in Example 1 except that the L/W ratio and the depth quantity d/do were adjusted to 1.00 and 0.95, respectively, in the minimum structure unit faces and the number of the minimum structural unit faces continuously arranged in the circumferential direction was changed as shown in Table 1. In the same manner as described in Example 1, the external pressure resistance and ERV value of the can barrel were measured and the packing test was carried out.

The obtained results are shown in Table 1.

Comparative Examples 8 and 9

A can barrel having a circumferential polyhedral wall was prepared in the same manner as described in Example 14 except that the number of the minimum structural unit faces shown in FIG. 3, which were arranged continuously in the circumferential direction, was changed as shown in Table 1. In the same manner as described in Example 1, the external pressure resistance and ERV value were measured and the packing test was carried out.

The obtained results are shown in Table 1.

Example 19

On a can barrel of a bonded can having an outer diameter of about 50 mm and a can height of 120 mm, which was prepared by lap-bonding an epoxy paint-coated TFS material having a thickness of 0.15 mm through a polyamide type adhesive, four hexagonal structural unit faces were formed continuously in the circumferential direction including the center of the can height at a width of 60 mm with a phase difference of ½ in the axial direction of the can by using a pressing tool, so that the L/W ratio was 1.00 and the depth quantity d/do was 0.90.

In the same manner as described in Example 1, the external pressure resistance and ERV value of the can value were measured and the packing test was carried out.

The obtained results are shown in Table 1.

Example 20

On a can barrel of a bonded can having an outer diameter of about 50 mm and a can height of 120 mm, which was prepared by lap-bonding an epoxy resin-coated TFS material having a thickness of 0.15 mm through a polyamide type adhesive, four structural unit faces shown in FIG. 13 were formed continuously in the circumferential direction including the center of the can height at a width of 60 mm with a phase difference of ½ in the axial direction by using a pressing tool, so that the L/W ratio was 1.0 and the depth quantity d/do is 0.90.

In the same manner as described in Example 1, the external pressure resistance and ERV value of the can barrel were measured and the packing test was carried out.

The obtained results are shown in Table 1.

Comparative Example 10

A can barrel having a circumferential polyhedral wall was prepared in the same manner as described in Example 1 except that two minimum structural unit faces shown in FIG. 11 were arranged continuously (n=2) in the circumferential direction. In the same manner as described in Example 1, the external pressure resistance and ERV value were measured and the packing test was carried out.

The obtained results are shown in Table 1.

TABLE 1

| | Kind of Can | Shape of Structural Unit Face | L/w | d/do | Number of Structural Unit Faces in Curcumferential Direction | Width (mm) of Basic Shape Row in Axial Direction of Can |
|---|---|---|---|---|---|---|
| Example | | | | | | |
| 1 | bonded can | FIG. 3 | 0.20 | 0.95 | 9 | 90 |
| 2 | bonded can | " | 0.41 | " | 9 | " |
| 3 | bonded can | " | 0.70 | " | 9 | " |
| 4 | bonded can | " | 0.96 | " | 9 | " |
| 5 | bonded can | " | 1.74 | " | 9 | " |
| 6 | bonded can | " | 2.00 | " | 9 | " |
| 7 | bonded can | " | 3.80 | " | 9 | " |
| Comparative Example | | | | | | |
| 1 | bonded | " | 5.50 | " | 9 | " |

TABLE 1-continued

| | | | | | | |
|---|---|---|---|---|---|---|
| 2 | bonded can | " | 7.20 | " | 9 | " |
| 3 | bonded can | " | 0.15 | " | 9 | " |
| 4 | bonded can | not formed | — | — | — | — |
| Example | | | | | | |
| 8 | bonded can | FIG. 3 | 0.96 | 0.50 | 9 | 90 |
| 9 | bonded can | " | " | 0.75 | " | " |
| 10 | bonded can | " | " | 0.98 | " | " |
| 11 | bonded can | " | " | 1.50 | " | " |
| 12 | bonded can | " | " | 1.93 | " | " |
| 13 | bonded can | " | " | 2.00 | " | " |
| Comparative Example | | | | | | |
| 5 | bonded can | " | " | 2.30 | " | " |
| 6 | bonded can | " | " | 3.00 | " | " |
| 7 | bonded can | " | " | 0.45 | " | " |
| Example | | | | | | |
| 14 | welded can | " | 1.00 | 0.95 | 7 | 60 |
| 15 | " | " | " | " | 9 | " |
| 16 | " | " | " | " | 10 | " |
| 17 | " | " | " | " | 12 | " |
| 18 | " | " | " | " | 14 | " |
| Comparative Example | | | | | | |
| 8 | " | " | " | " | 15 | " |
| 9 | " | " | " | " | 20 | " |
| Example | | | | | | |
| 19 | bonded can | FIG. 11 | " | 0.90 | 4 | 60 |
| 20 | " | FIG. 13 | " | " | 4 | " |
| Comparative Example 10 | " | FIG. 11 | " | " | 2 | " |

| | Sheet | | EVR (mA) of Empty Can | External Pressure Resistance (Kg/cm²) | Results of Packing Test | | |
|---|---|---|---|---|---|---|---|
| | kind | thickness (mm) | | | Deformation at sterilization and cooling | State of inner face of can | Amount eluted (ppm) of iron |
| Example | | | | | | | |
| 1 | TFS, DR8 | 0.15 | 0.01 | 2.0 | no change | no change | 0.00 |
| 2 | " | " | 0.01 | 2.7 | " | " | 0.00 |
| 3 | " | " | 0.01 | 4.0 | " | " | 0.00 |
| 4 | " | " | 0.01 | 5.0 | " | " | 0.00 |
| 5 | " | " | 0.01 | 2.5 | " | " | 0.00 |
| 6 | " | " | 0.01 | 2.2 | " | " | 0.00 |
| 7 | " | " | 0.01 | 2.0 | " | " | 0.00 |
| Comparative Example | | | | | | | |
| 1 | " | " | 0.01 | 1.5 | buckling of can barrel | rusting in buckled portion | 3.10 |
| 2 | " | " | 0.01 | 1.0 | " | rusting in buckled portion | 3.52 |
| 3 | " | " | 0.01 | 1.5 | " | rusting in buckled portion | 3.02 |
| 4 | " | " | 0.01 | 0.9 | " | rusting in buckled portion | 5.21 |
| Example | | | | | | | |
| 8 | TFS, DR8 | 0.12 | 0.01 | 1.7 | no change | no change | 0.25 |
| 9 | " | " | 0.01 | 1.9 | " | " | 0.17 |
| 10 | " | " | 0.01 | 2.0 | " | " | 0.15 |
| 11 | " | " | 0.03 | 2.1 | " | " | 0.18 |
| 12 | " | " | 0.05 | 2.1 | " | " | 0.25 |
| 13 | " | " | 0.09 | 2.2 | " | " | 0.36 |
| Comparative Example | | | | | | | |
| 5 | " | " | 1.20 | 2.2 | " | through holes formed by corrosion | — |
| 6 | " | " | 9.01 | — | breaking of can barrel | storage test impossible | — |
| 7 | " | " | 0.01 | 0.8 | buckling of can barrel | through holes formed by corrosion | — |

TABLE 1-continued

| Example | | | | | | | |
|---|---|---|---|---|---|---|---|
| 14 | tinplate, DR8 | 0.17 | 0.05 | 5.0 | no change | no change | 0.00 |
| 15 | " | " | 0.03 | 4.0 | " | " | 0.00 |
| 16 | " | " | 0.02 | 2.5 | " | " | 0.00 |
| 17 | " | " | 0.02 | 2.2 | " | " | 0.00 |
| 18 | " | " | 0.02 | 2.0 | " | " | 0.00 |
| Comparative Example | | | | | | | |
| 8 | " | " | 0.02 | 1.3 | buckling of can barrel | rusting in buckled portion | 5.23 |
| 9 | " | " | 0.02 | 1.0 | " | " | 6.70 |
| Example | | | | | | | |
| 19 | TFS, DR8 | 0.15 | 0.01 | 2.5 | no change | no change | 0.00 |
| 20 | " | " | 0.01 | 2.2 | " | " | 0.00 |
| Comparative Example 10 | " | " | 4.11 | 4.2 | partial deformation | rusting | 3.86 |

From the results obtained in Examples 1 through 7 and Comparative Examples 1 through 4, it is seen that if the L/W ratio is in the range of from 0.2 to 4.0, the external pressure resistance, the resistance to buckling during the heat sterilization and the corrosion resistance during the storage are highly improved over these resistances attained when the L/W ratio is outside the above-mentioned range or no circumferential polyhedral wall is formed.

From the results obtained in Examples 8 and 9 and Comparative Examples 5 through 7, it is seen that if d/do is in the range of from 0.5 to 2, the external pressure resistance, the buckling resistance during the heat sterilization and the corrosion resistance after the long-period storage are highly improved.

From the results obtained in Examples 1 and 14 through 18 and Comparative Examples 8 through 10, it is seen that if the number of minimum structural unit faces arranged continuously in the circumferential direction is in the range of from 3 to 14, the external pressure resistance, the buckling resistance of the can during the heat sterilization and the corrosion resistance after the long-period storage are improved.

Furthermore, from the results obtained in Examples 1 through 20 and Comparative Example 10, it is seen that the minimum structural unit faces may have a tetragonal shape, a hexagonal shape or an ellipsoidal shape and if the structural unit faces are arranged so that a certain phase difference is produced between adjacent rows of the structural unit faces in the axial direction of the can, a high effect of improving the external pressure resistance is attained.

We claim:

1. A cylindrical packing can having a resistance against deformation by external pressure, comprising a cylindrical can wall having at least a portion thereof formed as a circumferential polyhedral wall having a plurality of structural unit faces, boundary ridgelines where the structural units touch each other, and crossing portions where the boundary ridgelines cross each other, wherein as compared with the boundary ridgelines and crossing portions, the structural unit faces are convex to the interior of the can and the structural unit faces are arranged in a plurality of rows in both the circumferential direction and the axial direction of the can so that the adjacent rows of the structural unit faces have a phase difference in the axial direction of the can.

2. A packing can as set forth in claim 1, wherein the circumferential polyhedral wall is formed on an area of at least 10% of the entire surface of the can barrel.

3. A packing can as set forth in claim 1, wherein the number of the structural unit faces present on the same phase relatively to the axial direction of the can per circle of the can barrel is in the range of from 3 to 14.

4. A packing can as set forth in claim 1, wherein the maximum length L of the structural unit face in the axial direction of the can and the width W of the structural unit face in the circumferential direction satisfy the requirement of $0.2 \leq L/W \leq 4$.

5. A packing can as set forth in claim 1, wherein the ratio d/do of the depth quantity d indicating the dent of the structural unit face to the value do represented by (r-s) in which s represents the distance between the center of the can barrel and the middle point of the line connecting the crossing points showing the maximum width in the circumferential direction of the can or the middle point of the line connecting the points, showing the maximum width in the circumferential direction of the can, on the boundary ridgeline in the structural unit face and r represents the radius of the can barrel, satisfies the requirement of $0.5 \leq d/do \leq 2$.

6. A packing can as set forth in claim 1, wherein the structural unit face has a tetragonal shape, respective sides of the tetragonal shape are the boundary ridgelines, the extension direction of each boundary ridgeline is not in agreement with the axial direction of the can and each structural unit face is curved and convex from the boundary ridgeline toward the interior of the can.

7. A packing can as set forth in claim 1, wherein the structural unit face has a tetragonal shape, each side of the tetragonal shape is the boundary ridgeline, the axial section of the boundary ridgeline is bent substantially in a V-shape and is convex to the interior of the can, and each structural unit face is constructed by two equilateral triangles.

8. A packing can as set forth in claim 1, wherein the structural unit face has a hexagonal shape, each side of the tetragonal shape is the boundary ridgeline, and each structural unit face is curved and convex from the boundary ridgeline toward the interior of the can.

9. A packing can as set forth in claim 6, wherein the boundary ridgeline where the structural unit faces contact each other includes one bend having a certain gentle curvature radius R.

10. A packing can as set forth in claim 6, wherein an apex portion where the boundary ridgelines cross each other includes a plurality of bends having a gentle curvature radius R.

11. A packing can as set forth in claim 9 or 10, wherein R satisfies the requirement of $t \leq R \leq (\frac{1}{3})d$ in which t represents the sheet thickness and d represents the radius of the can barrel.

12. A cylindrical packing can having a resistance against deformation by external pressure, comprising a cylindrical can wall having at least a portion thereof formed as a circumferential polyhedral wall having a plurality of structural unit faces, boundary ridgelines where the structural units touch each other, and crossing portions where the boundary ridgelines cross each other, wherein as compared with the boundary ridgelines and crossing portions, the structural unit faces are convex to the interior of the can, and the structural unit faces are arranged in a plurality of rows in both the circumferential direction and the axial direction of the can so that the adjacent rows of structural unit faces have a phase difference in the axial direction of the can, said structural unit faces satisfying requirements represented by the following formulae:

$$0.2 \leq L/w \leq 4$$

wherein L represents the maximum length of the structural unit face in the axial direction of the can and w represents the width of the structural unit face in the circumferential direction, and $$0.5 \leq d/do \leq 2$$

wherein d indicates the depth of the dent of the structural unit face and do is equal to (r-s) in which s represents the distance between the center of the can barrel and the midpoint of the line connecting the crossing points corresponding to the maximum width in the circumferential direction of the can or the midpoint of the line connecting the points, corresponding to the maximum width in the circumferential direction, on the boundary ridgeline in the structural unit face and r represents the maximum radius of the can barrel.

* * * * *